US006109601A

United States Patent [19]

St. John, Sr.

[11] Patent Number: 6,109,601

[45] Date of Patent: Aug. 29, 2000

[54] FLY TYING DEVICE

[76] Inventor: Robert W. St. John, Sr., 31 Howard St., Laconia, N.H. 03246

[21] Appl. No.: 09/019,516

[22] Filed: Feb. 5, 1998

[51] Int. Cl.[7] ..................... B23Q 1/25

[52] U.S. Cl. ..................... 269/71; 269/249

[58] Field of Search ..................... 269/71, 74, 75, 269/76, 97, 249

[56] References Cited

U.S. PATENT DOCUMENTS

| | | | |
|---|---|---|---|
| 2,586,636 | 2/1952 | Fischer et al. | 81/25 |
| 2,756,789 | 7/1956 | Kraus et al. | 269/249 |
| 4,171,800 | 10/1979 | Weaver | 269/75 |

*Primary Examiner*—David A. Scherbel
*Assistant Examiner*—Daniel Shanley

[57] ABSTRACT

A fishing fly tying device is provided including a C-clamp having a generally C-shaped configuration with an exterior periphery, an interior periphery, a top end, and a bottom end. The bottom end has a bolt screwably coupled thereto. Such bolt has a first end and a second end with an engagement surface capable of releasably engaging the top end of the C-clamp. A rotator is included with an end rotatably coupled to the top end of the C-clamp about an axis perpendicularly situated with respect to the bolt of the C-clamp. A bore is formed in the rotator perpendicular with respect to the axis about which the rotator rotates. The rotator is further adapted to be selectively fixed with respect to the C-clamp. A hook clamp includes a rod slidably and rotatably situated within the bore of the rotator and further adapted to be selectively fixed with respect thereto. The hook clamp is equipped with an end having a pair of spaced members for clamping a hook.

1 Claim, 2 Drawing Sheets

FLY TYING DEVICE

BACKGROUND OF THE INVENTION

1. Field of the Invention

The present invention relates a fly hook-holding apparatuses and more particularly pertains to a new fly tying device for more conveniently tying a fly on a fishing hook.

2. Description of the Prior Art

The use of fly hook-holding apparatuses is known in the prior art. More specifically, fly hook-holding apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art fly hook-holding apparatuses include U.S. Pat. No. 5,291,646; U.S. Pat. Des. 263,113; U.S. Pat. No. 4,039,178; U.S. Pat. No. 4,903,929; and U.S. Pat. Des. 348,816.

In these respects, the fly tying device according to the present invention substantially departs from the conventional concepts and designs of the prior art, and in so doing provides an apparatus primarily developed for the purpose of conveniently tying a fly on a fishing hook.

SUMMARY OF THE INVENTION

In view of the foregoing disadvantages inherent in the known types of fly hook-holding apparatuses now present in the prior art, the present invention provides a new fly tying device construction wherein the same can be utilized for conveniently tying a fly on a fishing hook.

The general purpose of the present invention, which will be described subsequently in greater detail, is to provide a new fly tying device apparatus and method which has many of the advantages of the fly hook-holding apparatuses mentioned heretofore and many novel features that result in a new fly tying device which is not anticipated, rendered obvious, suggested, or even implied by any of the prior art fly hook-holding apparatuses, either alone or in any combination thereof.

To attain this, the present invention generally comprises a C-clamp having a generally C-shaped configuration. As shown in FIG. 1, the C-clamp is equipped with an exterior periphery and an interior periphery having a plurality of gripping undulations formed therein. The C-claim further has a top end and a bottom end with a bolt screwably coupled thereto. Such bolt has a first end with a knob formed thereon and a second end with an engagement surface capable of releasably engaging the top end of the C-clamp. Next provided is a rotator including a cylinder with a first end having a threaded bore formed therein in concentric relationship therewith. A diametrically disposed bore is formed in the cylinder in communication with the threaded bore. A second end of the cylinder is rotatably coupled to the top end of the C-clamp about an axis in perpendicular and coplanar relationship with the bolt of the C-clamp. It should be noted that the cylinder is adapted to be selectively fixed with respect to the C-clamp. Lastly, a hook clamp is provided including a rod slidably and rotatably situated within the diametrically disposed bore of the rotator. The hook clamp is capable of being selectively fixed with respect to the rotator via a set screw which is screwably engaged within the threaded bore of the rotator. The hook clamp is equipped with a first end having a cylindrical handle coupled thereto and a second end with a pair of spaced parallel resilient members both in general alignment with the rod. During use, the resilient members are adapted to be biased into abutment for clamping a hook therebetween.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fly tying device apparatus and method which has many of the advantages of the fly hook-holding apparatuses mentioned heretofore and many novel features that result in a new fly tying device which is not anticipated, rendered obvious, suggested, or even implied by any of the prior art fly hook-holding apparatuses, either alone or in any combination thereof.

It is another object of the present invention to provide a new fly tying device which may be easily and efficiently manufactured and marketed.

It is a further object of the present invention to provide a new fly tying device which is of a durable and reliable construction.

An even further object of the present invention is to provide a new fly tying device which is susceptible of a low cost of manufacture with regard to both materials and labor, and which accordingly is then susceptible of low prices of sale to the consuming public, thereby making such fly tying device economically available to the buying public.

Still yet another object of the present invention is to provide a new fly tying device which provides in the apparatuses and methods of the prior art some of the advantages thereof, while simultaneously overcoming some of the disadvantages normally associated therewith.

Still another object of the present invention is to provide a new fly tying device for more conveniently tying a fly on a fishing hook.

Even still another object of the present invention is to provide a new fly tying device that includes a C-clamp having a generally C-shaped configuration with an exterior periphery, an interior periphery, a top end, and a bottom end. The bottom end has a bolt screwably coupled thereto. Such bolt has a first end and a second end with an engagement surface capable of releasably engaging the top end of the C-clamp. A rotator is included with an end rotatably coupled to the top end of the C-clamp about an axis perpendicularly situated with respect to the bolt of the C-clamp. A bore is formed in the rotator perpendicular with respect to the axis about which the rotator rotates. The rotator is further adapted to be selectively fixed with respect to the C-clamp. A hook clamp includes a rod slidably and rotatably situated within the bore of the rotator and further adapted to be selectively fixed with respect thereto. The hook clamp is equipped with an end having a pair of spaced members for clamping a hook.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
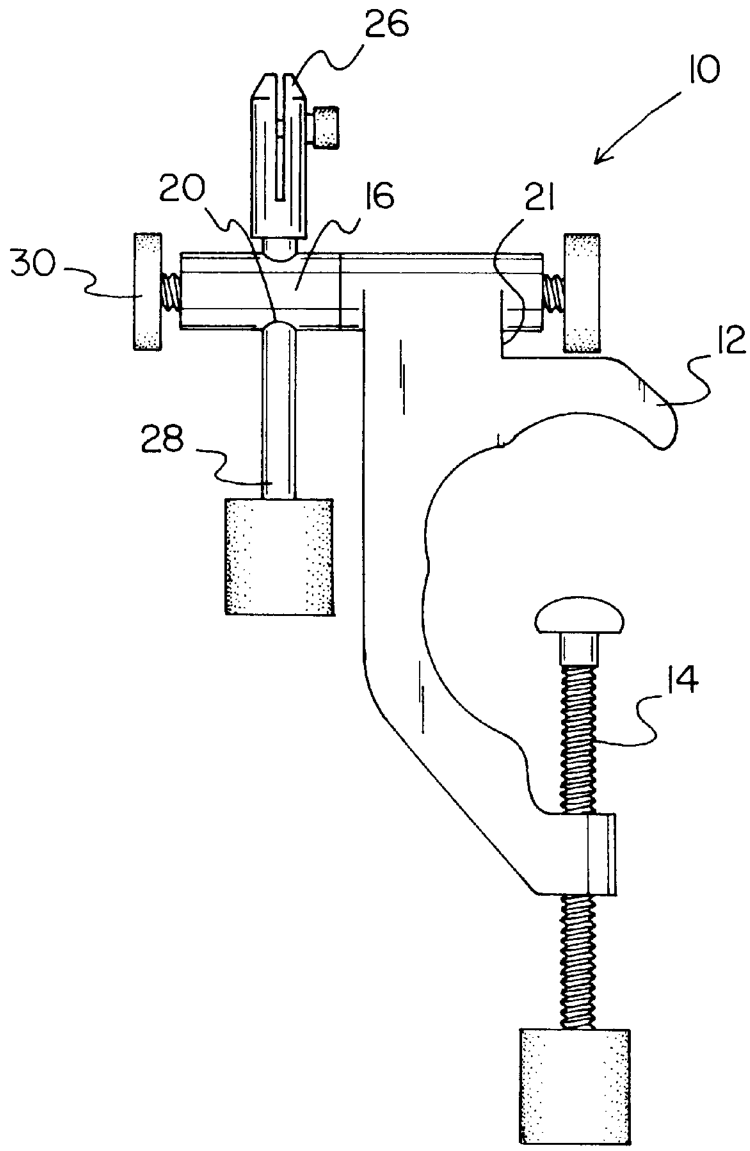
FIG. 1 is a side view of a new fly tying device according to the present invention.
Figure 2:
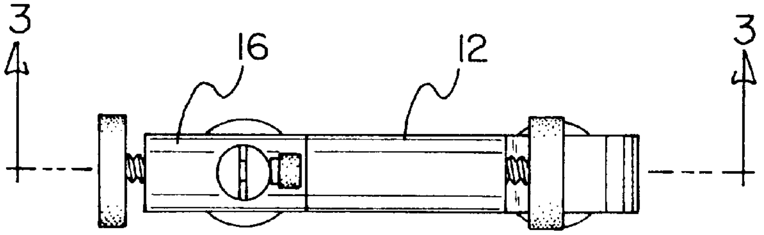
FIG. 2 is a top view of the present invention.

With reference now to the drawings, and in particular to FIGS. 1 through 4 thereof, a new fly tying device embodying the principles and concepts of the present invention and generally designated by the reference numeral 10 will be described.

The present invention, designated as numeral 10, includes a C-clamp 12 having a generally C-shaped configuration. As shown in FIG. 1, the C-clamp is equipped with an exterior periphery and an interior periphery having a plurality of gripping undulations formed therein. The C-clamp further has a top end and a bottom end with a bolt 14 screwably coupled thereto. Such bolt has a first end with a knob formed thereon and a second end with an engagement surface capable of releasably engaging the top end of the C-clamp.

Next provided is a rotator 16 including a cylinder with a free first end having a threaded bore 18 formed therein in concentric relationship therewith. A diametrically disposed bore 20 is formed in the cylinder in communication with the threaded bore. A second end of the cylinder is rotatably coupled to the top end of the C-clamp about an axis in perpendicular and coplanar relationship with the bolt of the C-clamp. A portion of the C-clamp to which the rotator is coupled preferably includes an extension 21 which extends upwardly and rearwardly from the top end of the C-clamp. It should be noted that the cylinder is adapted to be selectively fixed with respect C-clamp.

Figure 3:
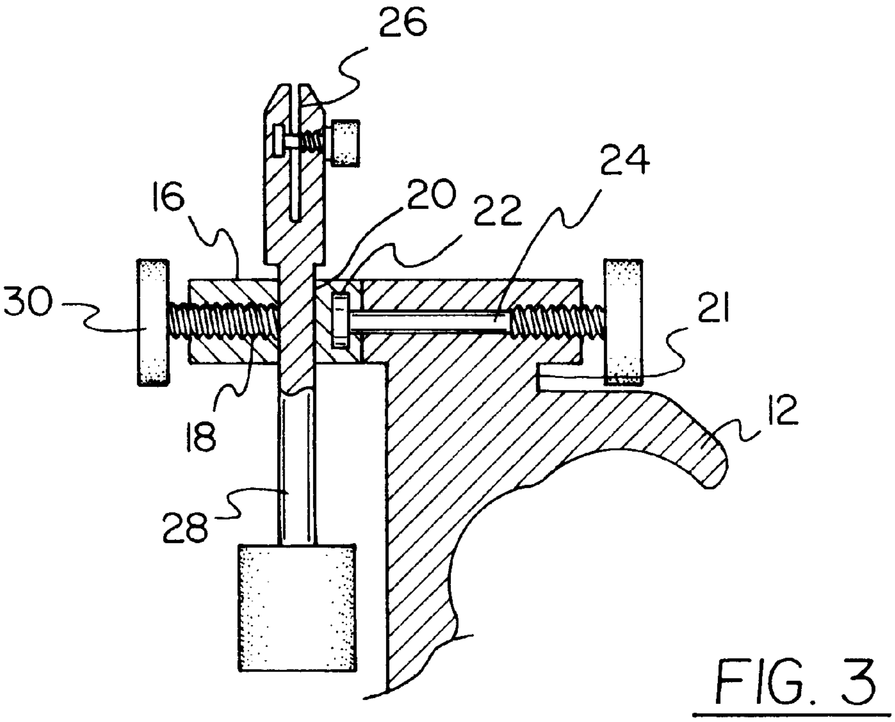
FIG. 3 is a side cross-sectional view of the present invention taken along line 3—3 shown in FIG. 2.
Figure 4:
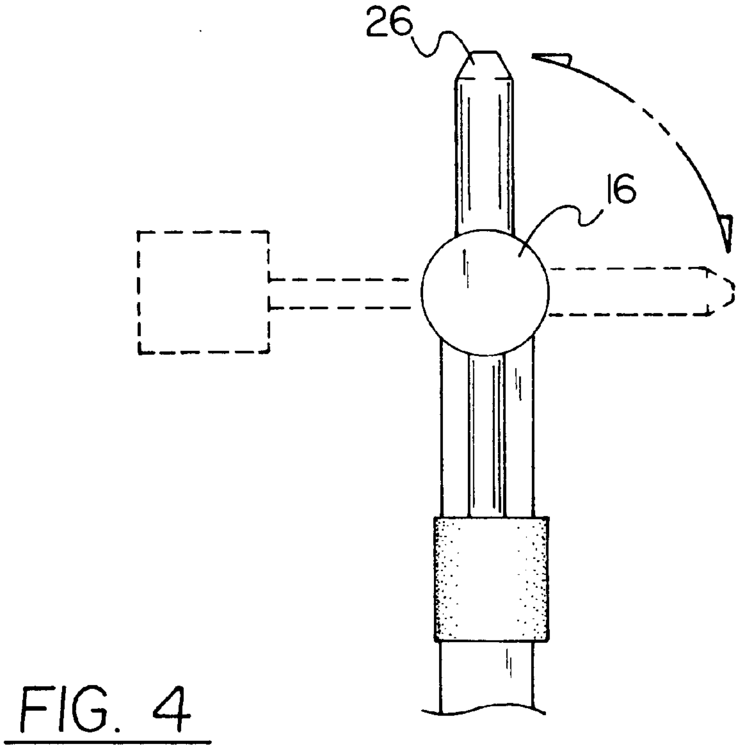
FIG. 4 is a rear view of the present invention showing the maneuverability of the rotator.

As best shown in FIG. 3, the selective fixing of the rotator is accomplished by way of a unique design. The second end of the cylinder has a disk-shaped recess 22 formed therein with an associated peripheral lip. A threaded post 24 is screwably engaged with the top end of the extension of the C-clamp. Such threaded post has a first end with a knob formed thereon which is situated above the top end of the C-clamp. A second end of the post is equipped with a disk-shaped member formed thereon for being rotatably received within the disk-shaped recess of the rotator.

Lastly, a hook clamp 26 is provided including a rod 28 slidably and rotatably situated within the diametrically disposed bore of the rotator. The hook clamp is capable of being selectively fixed with respect to the rotator via a set screw 30 which is screwably engaged within the threaded bore of the rotator. The hook clamp is equipped with a first end having a cylindrical handle coupled thereto and a second end with a pair of spaced parallel resilient members both in general alignment with the rod and having tapered ends. During use, the resilient members are adapted to be biased into abutment for clamping a hook therebetween. It should be noted that such function is preferably accomplished by way of a structure similar to the threaded post 24 and recess 22 associated with the rotator and C-clamp.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing fly tying device comprising:

a C-clamp having a generally C-shaped configuration with an exterior periphery, an interior periphery having an inner surface with a plurality of gripping undulations formed therein, each of the gripping undulations comprising an arcuate concave surface, the C-clamp having a top end and a bottom end, the bottom end having a bolt threadedly mounted to the bottom end, the bolt having a first end with a knob formed thereon and a second end with an engagement surface capable of releasably engaging the top end of the C-clamp, the engagement surface of the second end being dome-shaped and being extendable toward a medial portion of the arcuate concave surface of one of the gripping undulations such that a generally rounded object positioned between the engagement surface and the inner surface is pressed by the bolt toward the gripping undulation for facilitating a secure grip on the generally rounded object:

a rotator including a cylinder with a first end having a threaded bore formed therein in concentric relationship therewith, a diametrically disposed bore formed therein in communication with the threaded bore, a second end of the cylinder being rotatably coupled to the top end of the C-clamp about an axis in perpendicular and coplanar relationship with the bolt of the C-clamp and further adapted to be selectively fixed with respect thereto; and a hook clamp including a rod slidably and rotatably situated within the diametrically disposed bore of the rotator and further adapted to be selectively fixed with respect thereto, the hook clamp equipped with a first end having a cylindrical handle coupled thereto and a second end with a pair of spaced parallel resilient members both in general alignment with the rod, the resilient members adapted to be biased into abutment for clamping a hook therebetween.

* * * * *